(12) United States Patent
Esswie et al.

(10) Patent No.: US 12,231,983 B2
(45) Date of Patent: Feb. 18, 2025

(54) INTER-CELL PROACTIVE CO-ORDINATION IN TELECOMMUNICATION SYSTEMS

(71) Applicant: NOKIA TECHNOLOGIES OY, Espoo (FI)

(72) Inventors: Ali Esswie, Aalborg (DK); Klaus Ingemann Pedersen, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 299 days.

(21) Appl. No.: 17/793,852

(22) PCT Filed: Dec. 17, 2020

(86) PCT No.: PCT/EP2020/086636
§ 371 (c)(1),
(2) Date: Jul. 19, 2022

(87) PCT Pub. No.: WO2021/148204
PCT Pub. Date: Jul. 29, 2021

(65) Prior Publication Data
US 2023/0137088 A1 May 4, 2023

(30) Foreign Application Priority Data
Jan. 20, 2020 (GB) ..................................... 2000779

(51) Int. Cl.
*H04W 36/22* (2009.01)
*H04W 28/02* (2009.01)
*H04W 36/08* (2009.01)
(52) U.S. Cl.
CPC ....... *H04W 36/22* (2013.01); *H04W 28/0247* (2013.01); *H04W 36/08* (2013.01)
(58) Field of Classification Search
None
See application file for complete search history.

(56) References Cited

U.S. PATENT DOCUMENTS

2014/0269269 A1 9/2014 Kovvali et al.
2014/0295856 A1 10/2014 Chou et al.
(Continued)

FOREIGN PATENT DOCUMENTS

CN 109391997 A 2/2019
EP 2129175 A1 12/2009
(Continued)

OTHER PUBLICATIONS

International Search Report and Written Opinion dated Feb. 17, 2021 corresponding to International Patent Application No. PCT/EP2020/086636.
(Continued)

*Primary Examiner* — Suhail Khan
(74) *Attorney, Agent, or Firm* — Lippes Mathias LLP

(57) ABSTRACT

An apparatus, method and computer program is described comprising: generating a local outage time database for a first cell of a mobile communication system, wherein the local outage time database stores first latency data for each of a plurality of devices served by the first cell, wherein each first latency data comprises time left to outage data for the respective device; sending selected parts of the local outage time database to one or more other cells of the mobile communication network; receiving second latency data from at least one of the one or more other cells of the mobile communication system, wherein said second latency data includes time left to outage data for one or more devices served by said other cells; and generating a multi-cell outage time database including some or all of the shared selected parts of the local outage time database and some or all of the received second latency data.

20 Claims, 10 Drawing Sheets

(56) References Cited

U.S. PATENT DOCUMENTS

| | | |
|---|---|---|
| 2017/0346609 A1 | 11/2017 | Li et al. |
| 2017/0353873 A1 | 12/2017 | Aksela et al. |
| 2019/0007324 A1 | 1/2019 | Sebire et al. |
| 2019/0075580 A1 | 3/2019 | Chen et al. |
| 2023/0102852 A1* | 3/2023 | Andrae ............... H04W 36/12 370/331 |

FOREIGN PATENT DOCUMENTS

| | | |
|---|---|---|
| WO | 2019/035752 A1 | 2/2019 |
| WO | 2019/170209 A1 | 9/2019 |

OTHER PUBLICATIONS

3GPP TR 23.725 V16.2.0 (Jun. 2019), Technical Report, 3rd Generation Partnership Project; Technical Specification Group Services and System Aspects; Study on enhancement of Ultra-Reliable Low-Latency Communication (URLLC) support in the 5G Core network (5GC) (Release 16), Jun. 11, 2019, pp. 1-93, XP051753965.

Office Action dated Nov. 11, 2022, corresponding to Indian Patent Application No. 202247046385.

Jurdi et al., "Outage of Periodic Downlink Wireless Networks With Hard Deadlines", IEEE Transactions on Communications, vol. 67, No. 2, Feb. 2019, pp. 1238-1253.

Khoshnevisan et al., "5G Industrial Networks With COMP for URLLC and Time Sensitive Network Architecture", IEEE Journal on Selected Areas in Communications, vol. 37, No. 4, Apr. 2019, pp. 947-959.

Liu et al., "A D2D-Based Protocol for Ultra-Reliable Wireless Communications for Industrial Automation", IEEE Transactions on Wireless Communications, vol. 17, No. 8, Aug. 2018, pp. 5045-5058.

"3rd Generation Partnership Project; Technical Specification Group Radio Access Network; NG-RAN; Xn application protocol (XnAP) (Release 15)", 3GPP TS 38.423, V15.4.0, Jul. 2019, pp. 1-309.

Holma et al., "Small Cell Optimization", Wiley, Nov. 2015, 25 pages.

Ali, "An Overview on Interference Management in 3GPP LTE advanced Heterogeneous Networks", International Journal of Future Generation Communication and Networking, vol. 8, No. 1, 2015, pp. 55-68.

Liu et al., "An Overload Indicator & High Interference Indicator Hybrid Scheme for Inter-cell Interference Coordination in LTE System", 3rd IEEE International Conference on Broadband Network and Multimedia Technology (IC-BNMT), Oct. 26-28, 2010, pp. 514-518.

Search Report received for corresponding United Kingdom Patent Application No. 2000779.5, dated Oct. 6, 2020, 3 pages.

Notice of Allowance received for corresponding European Patent Application No. 20824270.1, dated Jun. 17, 2024, 8 pages.

Office Action received for corresponding Chinese Patent Application No. 202080093791.0, dated Jul. 29, 2024, 6 pages of Office Action and No. page of translation available.

"Signaling for Inter-eNB Operation of CoMP", 3GPP TSG RAN WG1 Meeting #76bis, R1-141790, Agenda: 7.2.6, Ericsson, Mar. 31-Apr. 4, 2014, 7 pages.

* cited by examiner

| Cell ID | UE ID | Time left to outage (ms) | Link | DL aggressor cell IDs |
|---|---|---|---|---|
| 1 | $ID_1$ | 40 | DL | $ID_i, ID_j...$ |
| | | 24 | UL | |
| 1 | $ID_2$ | 5 | DL | $ID_i, ID_j...$ |
| | | 3 | UL | |
| 1 | $ID_3$ | 2 | DL | No reports |

INTER-CELL PROACTIVE CO-ORDINATION IN TELECOMMUNICATION SYSTEMS

FIELD

The present specification relates to inter-cell proactive co-ordination in telecommunication systems, for example based on latency data.

BACKGROUND

Devices within a cell of a mobile communication system may have different latency budgets. Similarly, devices of neighbouring cells may have different latency budgets.

There remains a need for allocating resources in such communication systems.

SUMMARY

In a first aspect, this specification describes an apparatus comprising means for performing: generating a local outage time database for a first cell of a mobile communication system, wherein the local outage time database stores first latency data for each of a plurality of devices served by the first cell, wherein each first latency data comprises time left to outage data for the respective device; sending selected parts of the local outage time database to one or more other cells of the mobile communication network (e.g. comprising adjacent or neighbouring cells of the mobile communication network); receiving second latency data from at least one of the one or more other cells of the mobile communication system, wherein said second latency data includes time left to outage data for one or more devices served by said other cells; and generating a multi-cell outage time database including some or all of the shared selected parts of the local outage time database and some or all of the received second latency data. In this way, the multi-cell outage time database may store time to outage data for a plurality of devices served by the plurality of cells of the mobile communication system. The multi-cell outage time database may, for example, be a modified version of the local outage time database (including some or all of the other updates from other cells).

In some example embodiments, the means are further configured to perform: sorting the multi-cell outage time database in order of time left to outage data (e.g. in ascending order). Sorting the multi-cell outage time database in this way may enable the determination of a cell latency priority amongst a plurality of cells of the mobile communication system.

In some example embodiments the means are further configured to perform: identifying the cell serving the device having the shortest time left to outage as a highest priority cell amongst the first cell and the other cell(s).

The said means may be further configured to perform providing inter-cell co-ordination based on the identified highest priority cell. By way of example, providing inter-cell co-ordination may comprise: determining whether the first cell is lightly loaded; and in the event that the first cell is not the highest priority cell and is lighted loaded, sending an offloading proposal to the identified highest priority cell proposing offloading of one or more latency-critical devices from the highest priority cell to the first cell. The means may be further configured to perform: initiating the offload of said one or more latency-critical device on receipt of an acceptance of said offloading proposal from the identified highest priority cell.

As noted above, the said means may be further configured to perform providing inter-cell co-ordination (e.g. based on the identified highest priority cell). By way of example, providing inter-cell co-ordination may comprise: determining whether the first cell is highly loaded; and in the event that the first cell is not the highest priority cell and is highly loaded, sending muting proposal to the identified highest priority cell. The means may be further configured to perform: initiating muting of said first cell on receipt of an acceptance of said muting proposal from the highest priority cell.

In some example embodiments, providing inter-cell co-ordination comprises: receiving, at the first cell (e.g. the highest priority cell), an offload proposal or a muting proposal from one or more of said one or more other cells of the mobile communication system; and responding to said request in accordance with a protocol.

In some example embodiments, the means are further configured to perform: determining the selected parts of the local outage time database to send to the one or more other cells of the mobile communication network (e.g. by determining local outage time database entries with times left to outage below a threshold).

Sending said selected parts of the local outage time database to said one or more other cells of the mobile communication network may comprise sending an update message via an Xn interface of the communication system.

In some example embodiments, the means are further configured to perform: identifying cells of the one or more other cells of the mobile communication system as aggressor cells in the event that signal power at the first cell from said other cell compared with signal power received at the first cell from a server node is above a threshold.

The local outage time database for the first cell may store one or more of: a cell identifier for the first cell; an identifier for each of the plurality of devices served by the first cell; time left to outage data for each of said devices (e.g. per radio bearer per device); a link direction for each of the devices; and cell identifier for any identified aggressor cells.

Each entry of the multi-cell outage time database may comprise: a cell identifier; a device identifier; a time left to outage for the respective device; and a link direction for each of the devices.

The said means may comprise: at least one processor; and at least one memory including computer program code, the at least one memory and the computer program code configured, with the at least one processor, to cause the performance of the apparatus.

In a second aspect, this specification describes a method comprising: generating a local outage time database for a first cell of a mobile communication system, wherein the local outage time database stores first latency data for each of a plurality of devices served by the first cell, wherein each first latency data comprises time left to outage data for the respective device; sending selected parts of the local outage time database to one or more other cells of the mobile communication network (e.g. comprising adjacent or neighbouring cells of the mobile communication network); receiving second latency data from at least one of the one or more other cells of the mobile communication system, wherein said second latency data includes time left to outage data for one or more devices served by said other cells; and generating a multi-cell outage time database including some or all of the shared selected parts of the local outage time database and some or all of the received second latency data.

The method may comprise: sorting the multi-cell outage time database in order of time left to outage data (e.g. in ascending order).

The method may comprise: identifying the cell serving the device having the shortest time left to outage as a highest priority cell amongst the first cell and the other cell(s).

The method may comprise providing inter-cell co-ordination based on the identified highest priority cell. By way of example, providing inter-cell co-ordination may comprise: determining whether the first cell is lightly loaded; and in the event that the first cell is not the highest priority cell and is lighted loaded, sending an offloading proposal to the identified highest priority cell proposing offloading of one or more latency-critical devices from the highest priority cell to the first cell. The method may comprise: initiating the offload of said one or more latency-critical device on receipt of an acceptance of said offloading proposal from the identified highest priority cell.

Alternatively, or in addition, providing inter-cell co-ordination may comprise: determining whether the first cell is highly loaded; and in the event that the first cell is not the highest priority cell and is highly loaded, sending muting proposal to the identified highest priority cell. The method may comprise: initiating muting of said first cell on receipt of an acceptance of said muting proposal from the highest priority cell.

In some example embodiments, providing inter-cell co-ordination comprises: receiving, at the first cell (e.g. the highest priority cell), an offload proposal or a muting proposal from one or more of said one or more other cells of the mobile communication system; and responding to said request in accordance with a protocol.

The method may comprise: determining the selected parts of the local outage time database to send to the one or more other cells of the mobile communication network (e.g. by determining local outage time database entries with times left to outage below a threshold).

Sending said selected parts of the local outage time database to said one or more other cells of the mobile communication network may comprise sending an update message via an Xn interface of the communication system.

The method may comprise: identifying cells of the one or more other cells of the mobile communication system as aggressor cells in the event that signal power at the first cell from said other cell compared with signal power received at the first cell from a server node is above a threshold.

In a third aspect, this specification describes an apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: generating a local outage time database for a first cell of a mobile communication system, wherein the local outage time database stores first latency data for each of a plurality of devices served by the first cell, wherein each first latency data comprises time left to outage data for the respective device; sending selected parts of the local outage time database to one or more other cells of the mobile communication network (e.g. comprising adjacent or neighbouring cells of the mobile communication network); receiving second latency data from at least one of the one or more other cells of the mobile communication system, wherein said second latency data includes time left to outage data for one or more devices served by said other cells; and generating a multi-cell outage time database including some or all of the shared selected parts of the local outage time database and some or all of the received second latency data.

In a sixth aspect, this specification describes a computer-readable medium (such as a non-transitory computer-readable medium) comprising program instructions stored thereon for performing at least the following: generating a local outage time database for a first cell of a mobile communication system, wherein the local outage time database stores first latency data for each of a plurality of devices served by the first cell, wherein each first latency data comprises time left to outage data for the respective device; sending selected parts of the local outage time database to one or more other cells of the mobile communication network (e.g. comprising adjacent or neighbouring cells of the mobile communication network); receiving second latency data from at least one of the one or more other cells of the mobile communication system, wherein said second latency data includes time left to outage data for one or more devices served by said other cells; and generating a multi-cell outage time database including some or all of the shared selected parts of the local outage time database and some or all of the received second latency data.

In a seventh aspect, this specification describes an apparatus comprising: at least one processor; and at least one memory including computer program code which, when executed by the at least one processor, causes the apparatus to: generate a local outage time database for a first cell of a mobile communication system, wherein the local outage time database stores first latency data for each of a plurality of devices served by the first cell, wherein each first latency data comprises time left to outage data for the respective device; send selected parts of the local outage time database to one or more other cells of the mobile communication network (e.g. comprising adjacent or neighbouring cells of the mobile communication network); receive second latency data from at least one of the one or more other cells of the mobile communication system, wherein said second latency data includes time left to outage data for one or more devices served by said other cells; and generate a multi-cell outage time database including some or all of the shared selected parts of the local outage time database and some or all of the received second latency data.

In an eighth aspect, this specification describes an apparatus comprising: a local outage time database for a first cell of a mobile communication system, wherein the local outage time database stores first latency data for each of a plurality of devices served by the first cell, wherein each first latency data comprises time left to outage data for the respective device; an output for providing selected parts of the local outage time database to one or more other cells of the mobile communication network (e.g. comprising adjacent or neighbouring cells of the mobile communication network); an input for receiving second latency data from at least one of the one or more other cells of the mobile communication system, wherein said second latency data includes time left to outage data for one or more devices served by said other cells; and a control module for generating a multi-cell outage time database including some or all of the shared selected parts of the local outage time database and some or all of the received second latency data.

In a ninth aspect, this specification describes an apparatus comprising: means for generating a local outage time database for a first cell of a mobile communication system, wherein the local outage time database stores first latency data for each of a plurality of devices served by the first cell, wherein each first latency data comprises time left to outage data for the respective device; means for sending selected parts of the local outage time database to one or more other cells of the mobile communication network (e.g. comprising adjacent or neighbouring cells of the mobile communication network); means for receiving second latency data from at least one of the one or more other cells of the mobile communication system, wherein said second latency data includes time left to outage data for one or more devices served by said other cells; and means for generating a multi-cell outage time database including some or all of the shared selected parts of the local outage time database and some or all of the received second latency data.

BRIEF DESCRIPTION OF THE DRAWINGS

Example embodiments will now be described, by way of example only, with reference to the following schematic drawings, in which.

DETAILED DESCRIPTION

Figures 1, 2:
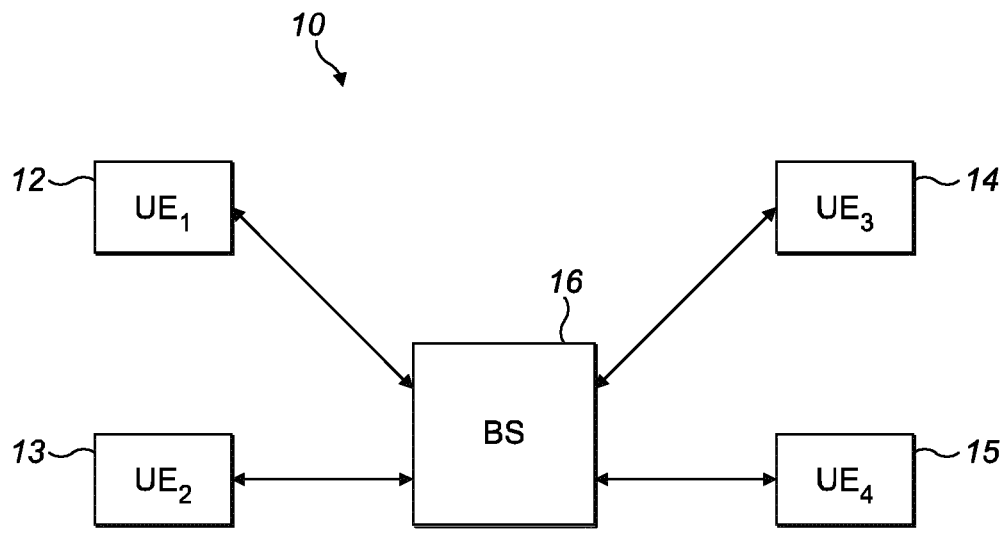
FIG. 1 is a block diagram of a system in accordance with an example embodiment.
FIG. 2 is a table in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a system, indicated generally by the reference numeral 10, in accordance with an example embodiment. The system 10 comprises a plurality of devices (a first device 12, a second device 13, a third device 14 and a fourth device 15 are shown in FIG. 1) in communication with a base station 16. The system 10 forms part of a mobile communication system. Although user devices are shown in FIG. 1, the devices 12 to 15 may take many forms, such as industrial equipment (e.g. robots, machinery etc.) or the like.

In an example embodiment, each of the plurality of devices 12 to 15 has a latency budget. A latency budget may be defined as the maximum supported time duration from the moment a packet arrives at the transmitter until it has been successfully received by the intended receiver. In the event that a device-specific latency budget is violated, due to, e.g., successive packet drops because of, e.g., inter-cell interference, dynamic-TDD cross link interference, overloading, etc., the device may exhibit an outage. For example, in the event that a latency budget of a robotic arm is violated, that robotic arm may shutdown.

FIG. 2 is a table, indicated generally by the reference numeral 20, in accordance with an example embodiment. The example table 20 shows part of a local outage time database (OTD) for the system 10 (which system may be referred to as a first cell).

The table 20 stores:
- A cell identifier (Cell ID) for the relevant cell. The cell identifier is a global unique cell ID of the current serving cell.
- A device identifier (UE ID) for each of the plurality of devices served by the first cell (e.g. the first to fourth devices 12 to 15 described above).
- Time left to outage data for each of said devices (e.g. per radio bearer per device). The time left to outage data is a value in milliseconds to indicate how much time is left before a running radio bearer of an active device enters an outage if its uplink (UL) or downlink (DL) packets are not successfully processed within the relevant time deadline. This time may be captured on the packet data convergence protocol (PDCP) layer level. A simple decreasing timer may be used at the cell side to determine the time left to outage data, which timer is initialized by the value of 'maximum latency budget' of each flow. The timer can then be activated when an active radio bearer flow becomes available for transmission. Per each transmission time interval (TTI) duration, such timers may be locally updated in the sense that each is either reset, in case the corresponding packets of the flow have been successfully received or is left to continue decreasing if corresponding packets are still pending, e.g., inflicting either packet drops or several HARQ re-transmissions.
- A link direction for each of the devices, e.g. whether the intended link direction is uplink (UL) or downlink (DL).
- A cell identifier (Cell ID) for any identified aggressor cells. This entry includes the reported cell IDs of the downlink aggressor cells reported by the active devices in the downlink direction. In an example embodiment, a serving cell of a mobile communication system first configures its active devices with inter-cell interference measurements. Through the higher RRC signalling, a cell may configure its devices to identify the downlink interference aggressor cells by measuring the reference signal receive power (RSRP) of the neighbouring cells. Accordingly, devices report serving cells with the primary cell ID (PCI) IDs of the neighbouring cells with a comparable RSRP coverage as: the cells which satisfy $RSRP_{serving} - RSRP_{neighbor} < P$, where P is a predefined RSRP threshold signalled through the physical downlink control channel (PDCCH).

Example embodiments of the principles described herein include neighbouring cells within an industrial or factory setting, associated with a tight radio latency budge per connected devices. Example applications include:

Both frequency division duplexing (FDD) and dynamic time division duplexing (TDD) modes.

Ultra-reliable low latency communication (URLLC) deployments with sporadic packet arrivals and dynamic user scheduling.

Time sensitive communication (TSC) deployments with deterministic packet arrivals and semi-persistent scheduling.

Figure 3:
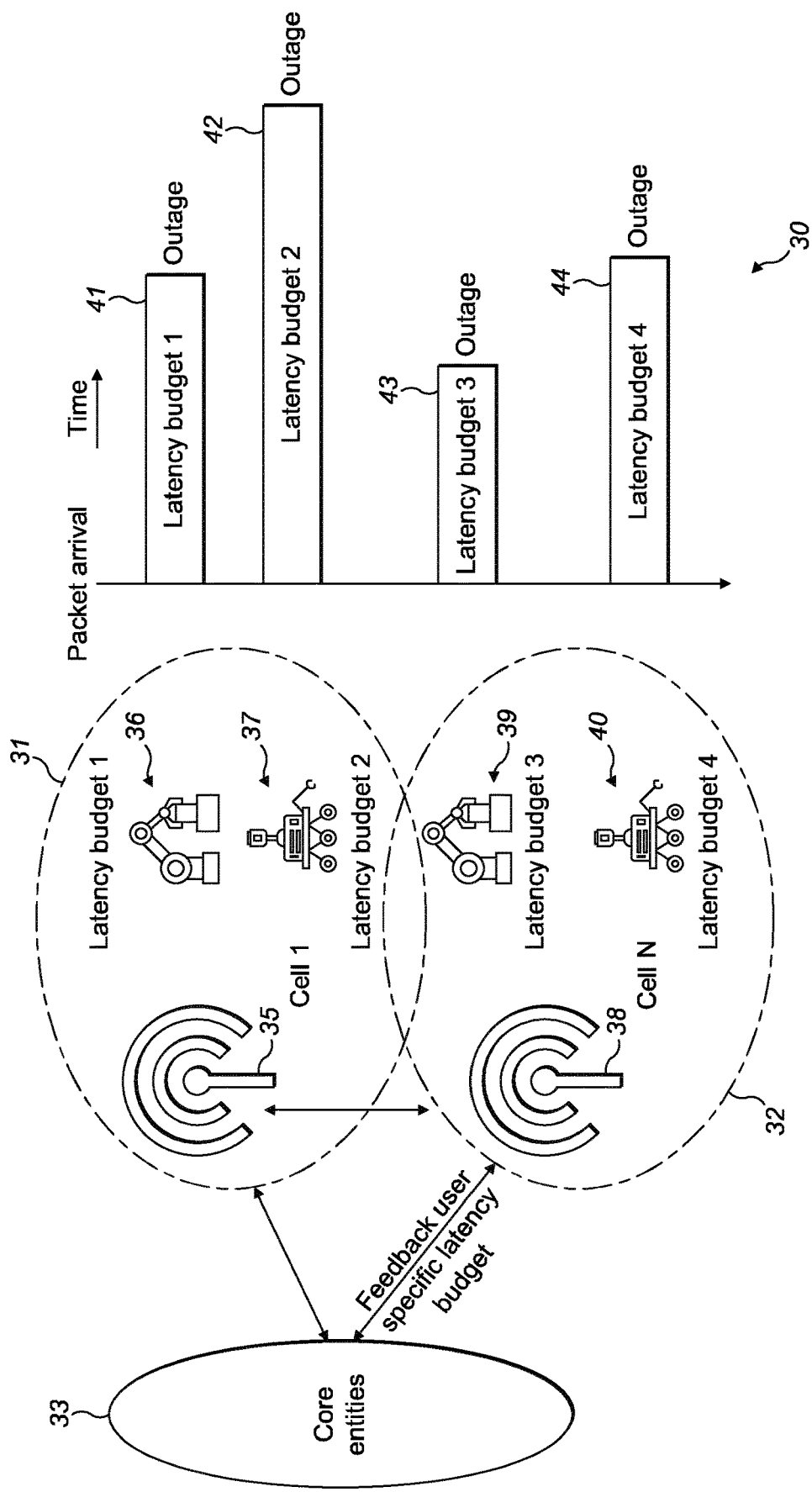
FIGS. 3 and 4 are block diagrams of systems in accordance with example embodiments.

FIG. 3 is a block diagram of a system, indicated generally by the reference numeral 30, in accordance with an example embodiment.

The system 30 comprises a first cell 31 and a second cell 32, both of which are in communication with a core network 33. The first cell 31 includes a communication node 35 (such as a base station), a first device 36 and a second device 37. The second cell 32 includes a communication node 38 (such as a base station), a third device 39 and a fourth device 40.

The first to fourth devices of the system 30 each have a latency budget. For example, as shown in the system 30, the first device 36 has a first latency budget 41, the second device 37 has a second latency budget 42, the third device 39 has a third latency budget 43, and the fourth device 40 has a fourth latency budget 44.

Figure 4:
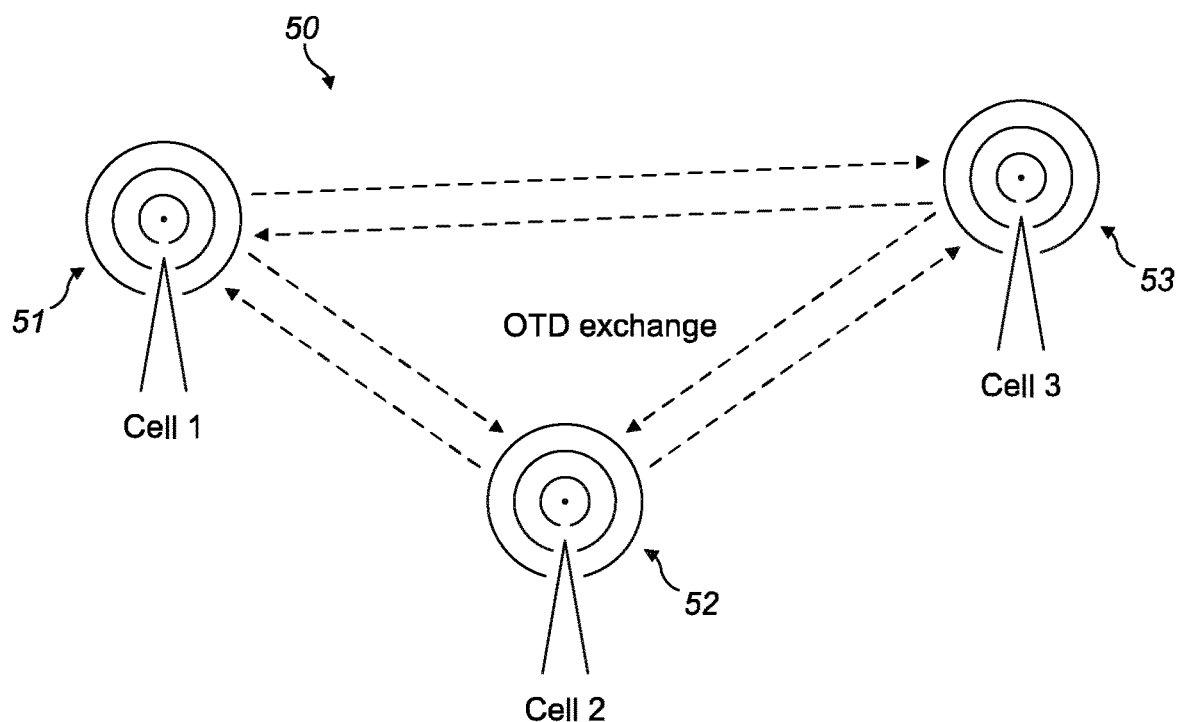

FIG. 4 is a block diagram of a system, indicated generally by the reference numeral 50, in accordance with an example embodiment. The system 50 is a mobile communication system comprising a first cell 51, a second cell 52 and a third cell 53. Each of the cells 51 to 53 may be similar to the cells 31 and 32 described above. Local outage time databases (OTDs) may be generated for each of the cells 51 to 53 and at least some data of said OTD may be transferred between cells (as indicated by the arrows in FIG. 4).

As described below, exchanging outage time database (OTD) data between adjacent cells enables those cells to work together to seek to achieve device-specific latency-aware co-ordinated transmissions. For example, at an arbitrary time, devices with low dynamically-calculated latency allowance before an outage may be prioritized in order to improve the overall outage performance of the system 50.

Figure 5:
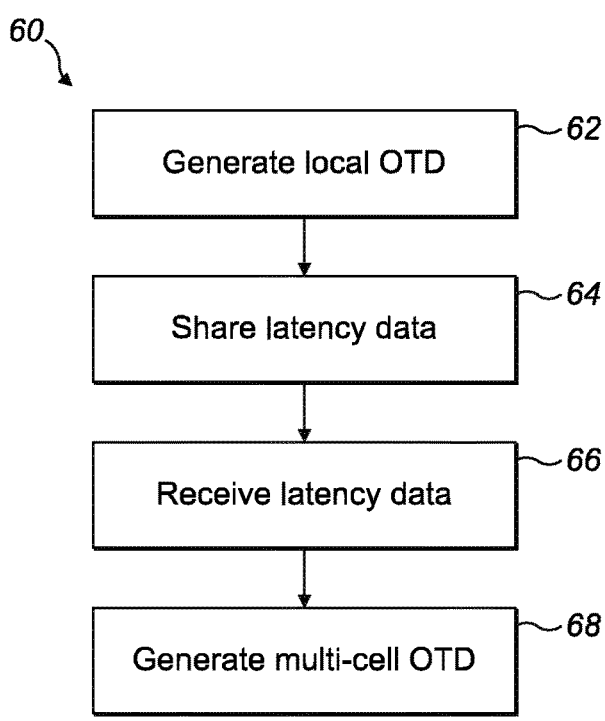
FIG. 5 is a flowchart showing an algorithm in accordance with an example embodiment.

FIG. 5 is a flowchart showing an algorithm, indicated generally by the reference numeral 60, in accordance with an example embodiment.

The algorithm 60 starts at operation 62, wherein a local outage time database (OTD) is generated for a first cell of a mobile communication system (such as one of the cells 31 and 33 of the system 30 or one of the cells 51 to 53 of the system 50). As described above, the local outage time database stores a latency budget for each of a plurality of devices served by the first cell, wherein each latency budget comprises time left to outage data for the respective device.

At operation 64, some or all of the latency data for the first cell are shared with one or more other cells. For example, latency data generated for the first cell 51 described above may be shared with the second and third cells 52 and 53 of the system 50. Sharing latency data may include sending selected parts of the local outage time database to one or more other cells of the mobile communication network. These cells may be adjacent or neighbouring cells of the relevant mobile communication network. The operation 64 may be implemented by generating a local outage time database (OTD) such as the OTD 20 described above and sending some or all of that OTD to the other cells.

By way of example, each cell may share latency data for all entries in the relevant local OTD where the time-left-to-outage is below a predefined latency threshold.

The sharing of latency data in the operation 64 may be different for uplink and downlink transmissions.

For downlink transmissions, in the event that there are device-reported downlink (DL) aggressor cells, the cells may exchange these corresponding entries as part of an OTD update message (e.g. an information object). The OTD update message may be sent (e.g. over the Xn-interface) only with those DL aggressor adjacent cells. The OTD update message may include the following data: Cell ID, UE ID, time-left-to-outage per DRB per UE, and link direction per DRB per UE. In the event that there are no reported DL aggressor cells for the respective devices, the cells may skip these entries from the inter-cell exchange, since neither coordinated ICIC nor traffic offloading is applicable in this case.

For uplink transmissions, the cell may these corresponding entries as an OTD update message (e.g. over the Xn-interface) with all tier-1 adjacent cells. As noted above, the OTD update message may include: Cell ID, UE ID, time-left-to-outage per DRB per UE, and link direction per DRB per UE.

At operation 66, latency data are received (at the first cell) from at least one of the one or more other cells of the mobile communication system, wherein said latency data includes time left to outage data for one or more devices served by said other cells. For example, the first cell 51 may receive latency data (e.g. in the form of an OTD or a portion of an OTD) from the second cell 52 and/or the third cell 53 of the system 50, At operation 68, a multi-cell outage time database is generated at the first cell (such as the cell 51). The multi-cell OTD may a modified version of the local OTD generated at the first cell. For example, the local OTD may be modified to include updates from other cells (i.e. some or all of the latency data received in the operation 66) in order to generate the multi-cell OTD.

In the context of the system 50, the first cell 51 may generate a multi-cell OTD by modifying a local OTD generated at the first cell using latency data obtained from other cells in the system 50. Similarly, the second and third cells 52 and 53 may each generate a multi-cell OTD by modifying a local OTD generated at the respective cell using latency data obtained from other cells in the system 50.

Figures 6, 7:
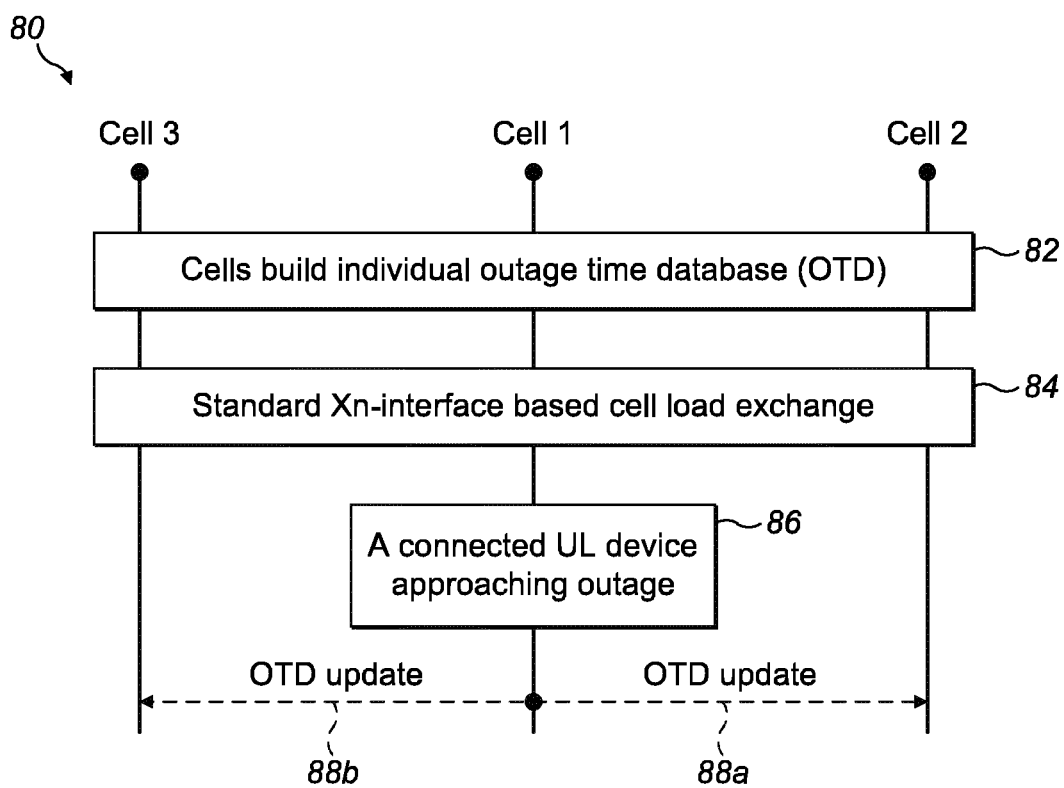
FIG. 6 is a table in accordance with an example embodiment.
FIG. 7 is a message sequence in accordance with an example embodiment.

FIG. 6 is a table, indicated generally by the reference numeral 70, in accordance with an example embodiment. The table 70 shows an extract of an example multi-cell outage time database (OTD).

The table 70 stores:

A cell identifier (Cell ID) for the relevant cell. The cell identifier is a global unique cell ID of the current serving cell. In the example table 70, the first entry relates to data from a first cell and the second entry relates to data from a third cell.

A device identifier (UE ID).

Time left to outage data for the respective device.

A link direction for the respective device.

Thus, the table 70 includes similar entries to the table 20 described above. In the particular example table 70, the aggressor cell IDs are not reported (although they could be in some example embodiments). One reason for omitting aggressor cell IDs is that a first cell receiving an OTD update from an adjacent cell may understand that the first cell is acting as an aggressor for that adjacent cell.

FIG. 7 is a message sequence, indicated generally by the reference numeral 80, in accordance with an example embodiment. The messages sequence 80 shows messages transferred between a Cell 1 (such as the first cell 51 described above), Cell 2 (such as the second cell 52 described above) and Cell 3 (such as the third cell 53 described above).

At operation 82, each of the cells builds an individual outage time database (OTD). The operation 82 includes a number of steps.

Each of the cells first configures its active devices with inter-cell interference measurements.

Through the higher RRC signalling, each cell configures its devices to identify the downlink interference aggressor cells by measuring the RSRP of the neighbouring cells. Accordingly, devices report serving cells with the PCI IDs of the neighbouring cells with a comparable RSRP coverage as: the cells which satisfy $RSRP_{serving} - RSRP_{neighbor} < P$, where P is a predefined RSRP threshold signaled through the PDCCH.

Accordingly, the maximum outage latency budget of each active device may be identified from the core entities handling the QoS PDCP flows.

Based on the information generated as discussed above, a local OTD can be generated at each cell (thereby implementing operation 62 of the algorithm 60). As discussed above, each locally generated OTD includes data such as: cell ID; UE ID; time-left-to-outage (ms) per DRB per UE; link direction per DRB per UE; and DL aggressor cell ID per UE.

At operation 84, load information is exchange between the cells as part of Xn-interface specifications. In this way, each cell becomes aware of the load level of its surrounding cells.

At operation 86, the first cell determines that a connected device of the first cell is approaching an outage condition. This condition can be detected on the basis of the time to outage data of the locally generated OTD.

In response to the detection is operation 86, an OTD update (information object) is sent to the second cell using message 88a and is also sent to the third cell using message 88b.

For the downlink direction, in the event that there are devices reporting DL aggressor cells, the OTD update may be shared only with those DL aggressor adjacent cells. In the event that there are no reported DL aggressor cells for the respective device, an OTD update message may be omitted, since neither coordinated ICIC nor traffic offloading is applicable in this case.

For the uplink direction, the first cell sends the OTD update message to all tier-1 adjacent cells, as discussed above.

Figure 8:
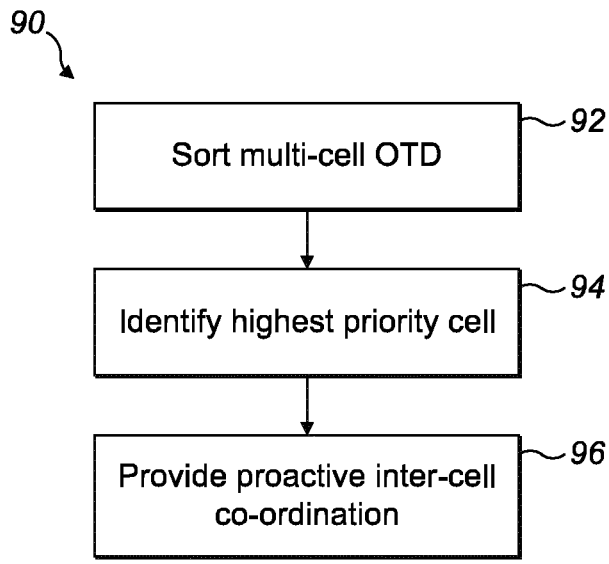
FIG. 8 is a flowchart showing an algorithm in accordance with an example embodiment.

FIG. 8 is a flowchart showing an algorithm, indicated generally by the reference numeral 90, in accordance with an example embodiment.

The algorithm 90 assumes that a multi-cell OTD has been obtained or generated. For example, a multi-cell OTD may be generated using the algorithm 60 described above.

The algorithm 90 starts at operation 92, where the obtained or generated multi-cell outage time database (OTD) is sorted in order of said time left to outage data. For example, the multi-cell OTD may be sorted in ascending order of time left to outage. The sorting may enable a cell latency priority to be determined amongst a plurality of cells of a mobile communication system.

At operation 94, the highest priority cell is identified. For example, the operation 94 may identify the cell serving the device having the shortest time left to outage as a highest priority cell amongst the various cells of the communication system (such as the cells 31 and 32 or the cells 51 to 53 described above).

At operation 96, inter-cell co-ordination is provided based on the highest priority cell identified in operation 94. A number of example options for inter-cell co-ordination are described in detail below.

It should be noted that assuming efficient link adaptation and user scheduling are in place, violating the PDCP, i.e., DRB, flow-specific latency bounds can often be attributed to either overloaded capacity or strong cross-cell interference. Hence, inter-cell proactive coordination by means of traffic offloading or interference coordination are attractive options. The example embodiments herein describe device-specific latency aware embodiments (rather than an average-cell latency aware that might lead to device-specific outage events).

Figure 9:
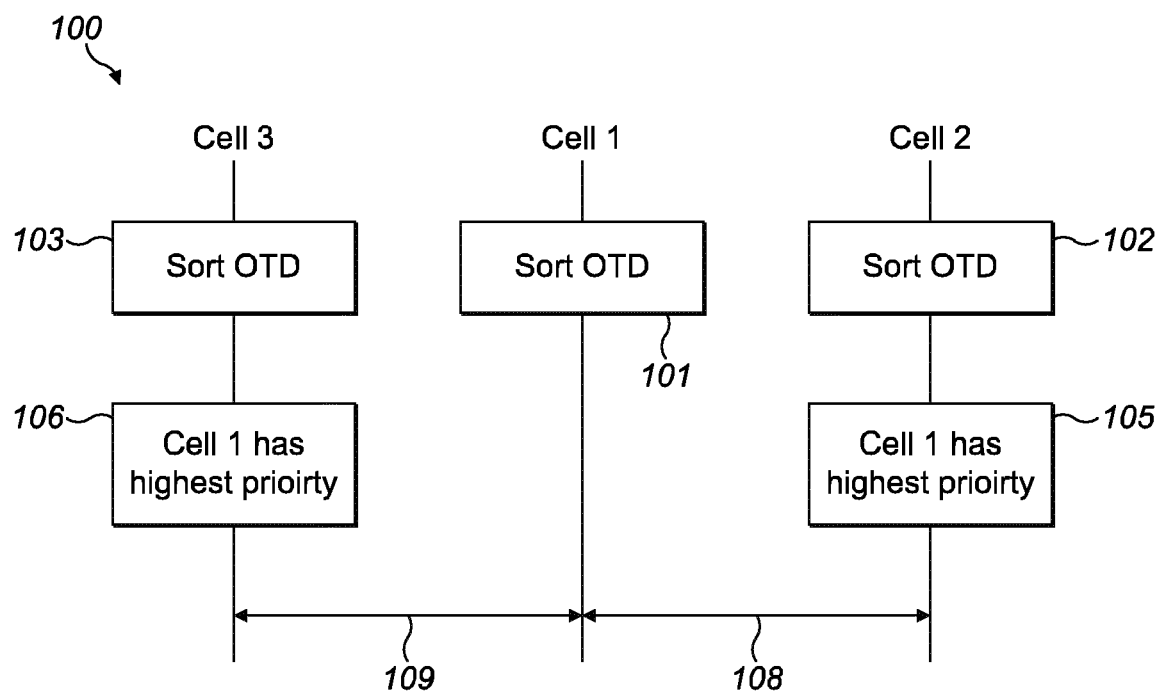
FIG. 9 is a message sequence in accordance with an example embodiment.

FIG. 9 is a message sequence, indicated generally by the reference numeral 100, in accordance with an example embodiment. The message sequence 100 is an example implementation of the algorithm 90 described above, for example using the system 50 described above, including the first cell 51, second cell 52 and third cell 53.

At operation 101, a first cell Cell 1 (e.g the first cell) 51 sorts a multi-cell OTD generated or obtained by the first cell. Similarly, at operation 102, the second cell Cell 2 (e.g. the second cell 52) sorts a multi-cell OTD generated or obtained by the second cell and at operation 103, the third cell Cell 3 (e.g. the third cell 53) sorts a multi-cell OTD generated or obtained by the third cell. Thus, the operations 101 to 103 implement the operation 92 of the algorithm 90 described above.

At operation 105, the second cell identifies the first cell as the highest priority cell (thereby implementing one instance of the operation 94 of the algorithm 90 described above). Similarly, at operation 106, the third cell identifies the first cell as the highest priority cell (thereby implementing another instance of the operation 94 of the algorithm 90 described above).

In response to identifying that the first cell has the highest priority, the second cell exchanges messages 108 with the first cell and the third cell exchanges messages 109 with the first cell. The messages 108 and 109 (examples of which are discussed further below) are example implementations of the operation 96 described above.

The operation 96 (and the messages 108 and 109) may take many different forms.

Figure 10:
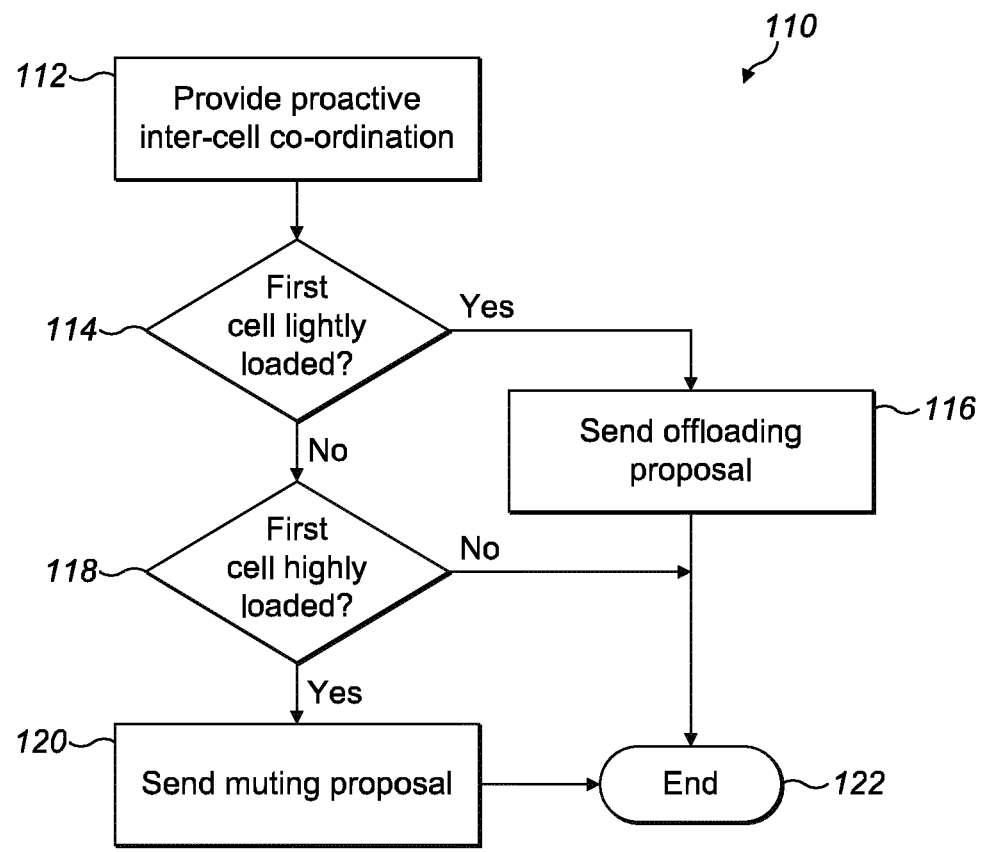
FIG. 10 is a flowchart showing an algorithm in accordance with an example embodiment.

FIG. 10 is a flowchart showing an algorithm, indicated generally by the reference numeral 110, in accordance with an example embodiment. The algorithm 110 is an example implementation of the operation 96.

The algorithm 110 is implemented at a cell of a communication system, such as the system 50 described above, that has a plurality of cells, including a first cell that has determined (in an instance of the operation 94 described above) that it is not the highest priority cell.

At operation 112, the first cell determines that protective inter-cell co-ordination is required.

At operation 114, it is determined whether the first cell is lightly loaded. If so (such that the first cell in not the highest priority cell and is lightly loaded), the algorithm moves to operation 116; otherwise, the algorithm moves to operation 118.

At operation 116, an offloading proposal is sent (from the first cell) to the identified highest priority cell proposing offloading of one or more latency-critical devices from the highest priority cell to the first cell. The algorithm 110 then terminates at operation 122. As discussed in detail below, an offload of one or more latency-critical devices to the first cell may be implemented on receipt of an acceptance of said offload proposal from the identified highest priority cell.

At operation 118, it is determined whether the first cell his highly loaded. If so (such that the first cell in not the highest priority cell and is highly loaded), the algorithm moves to operation 120; otherwise the algorithm terminates at operation 122.

At operation 120, a muting proposal is sent (from the first cell) to the identified highest priority cell proposing muting of the first cell. The algorithm 110 then terminates at operation 122. As discussed in detail below, muting of the first cell may be implemented on receipt of an acceptance of said muting proposal from the identified highest priority cell.

It should be noted that in the algorithm 110 (and in the message sequences described in detailed below), the muting and offloading proposals are triggered by a cell offering proactive inter-cell assistance (rather than a cell requesting such assistance). Since a cell offering assistance is aware of its own conditions, it can offer inter-cell co-ordination (such as muting or offloading proposals) that it can accept. If such an offer is accepted, it may be possible to implement the offer immediately, without any further message exchanges. In contrast, some example systems in which a cell requests assistance (such as muting or offloading assistance) may require a further one or more additional rounds of inter-cell signalling in order to determine the parameters of the assistance to be given. In embodiments with tight latency budgets, having reducing the number of rounds of inter-cell signalling can be advantageous.

Figure 11:
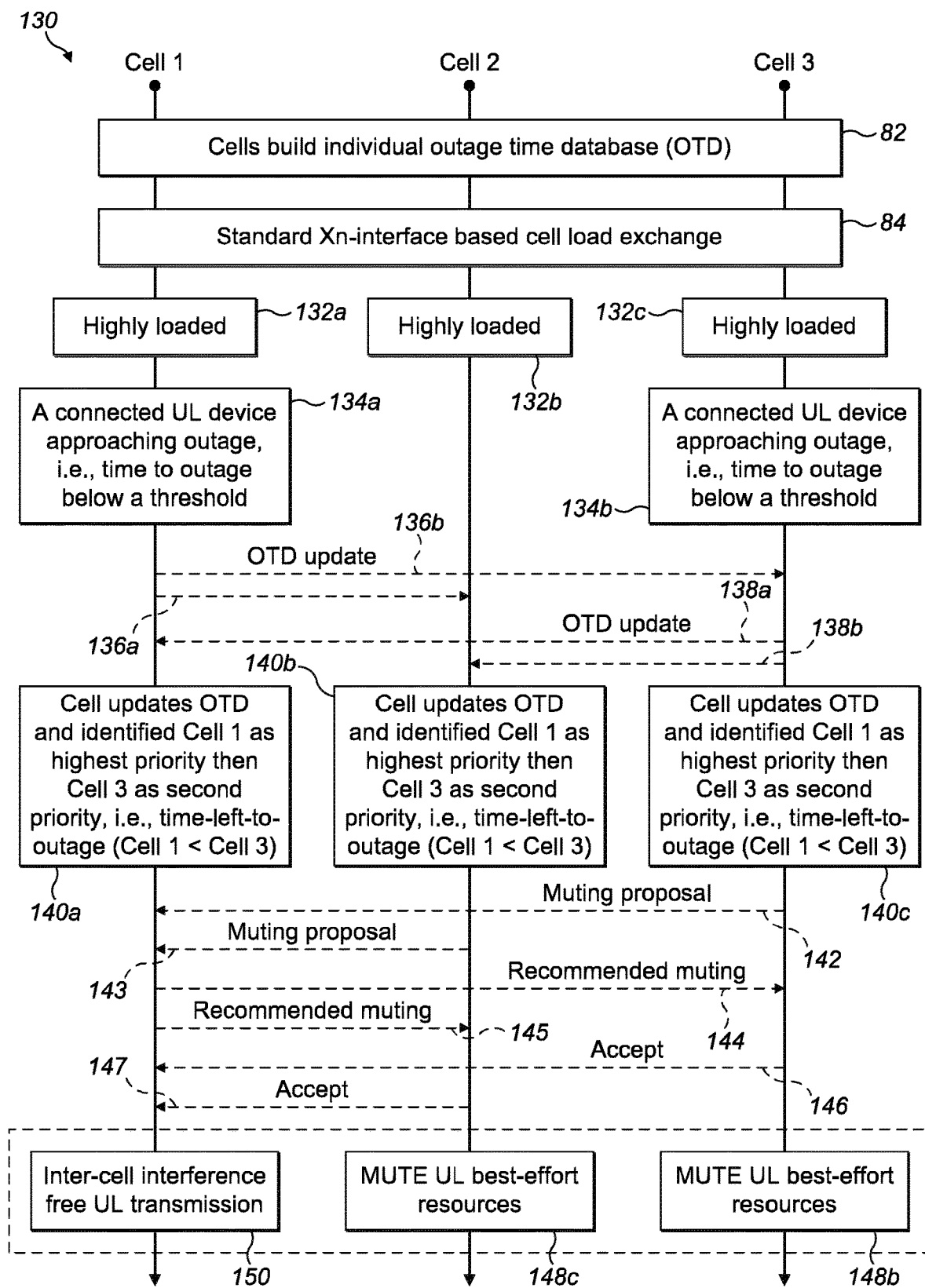
FIGS. 11 and 12 are message sequence in accordance with example embodiments.

FIG. 11 is a message sequence, indicated generally by the reference numeral 130, in accordance with an example embodiment. The message sequence 130 shows messages transferred between a Cell 1 (such as the first cell 51 described above), Cell 2 (such as the second cell 52 described above) and Cell 3 (such as the third cell 53 described above).

At operation 82, each of the cells builds an individual/local outage time database (OTD). The operation 82 includes a number of steps, as discussed further above.

At operation 84, load information is exchange between the cells as part of Xn-interface specifications. In this way, each cell becomes aware of the load level of its surrounding cells.

At operation 132a, it is determined that Cell 1 is highly loaded. Similarly, at operation 132b it is determined that the Cell 2 is highly loaded and at operation 132c it is determined that the Cell 3 is highly loaded.

At operation 134a, it is determined that an uplink device at Cell 1 is approaching an outage condition (i.e. a time to outage of the uplink device is below a threshold level). In response to the determination at operation 134a, an OTD update message 136a is sent from Cell 1 to Cell 2 and an OTD update message 136b is sent from Cell 1 to Cell 3. As discussed above, the OTD update messages 136a and 136b enable multi-cell OTDs to be generated at Cell 2 and Cell 3.

Similarly, at operation 134b, it is determined that an uplink device at Cell 3 is approaching an outage condition (i.e. a time to outage of the uplink device is below a threshold level). In response to the determination at operation 134b, an OTD update message 138a is sent from Cell 3 to Cell 1 and an OTD update message 138b is sent from Cell 3 to Cell 2. As discussed above, the OTD update messages 138a and 138b enable multi-cell OTDs to be generated at Cell 1 and Cell 2.

At this stage, multi-cell OTDs are generated at each cell and those multi-cell OTDs may be locally sorted. This enables the relative priorities of the cells to be determined (such that the cell with the lowest time to outage remaining can be identified).

At operation 140a, it is determined (at Cell 1) that Cell 1 has the highest priority and that Cell 3 has the second highest priority. Similar determinations are made in operation 140b (at Cell 2) and operation 140c (at Cell 3).

At Cell 3, a determination is made that Cell 3 is highly loaded, but is not the highest priority cell. As a result, a muting proposal 142 is sent from Cell 3 to the highest priority cell (Cell 1 in this example). The muting proposal 142 proposes to Cell 1 that Cell 3 be muted in order to provide proactive inter-cell co-ordination.

Similarly, at Cell 2, a determination is made that Cell 2 is highly loaded, but is not the highest priority cell. As a result, a muting proposal 143 is sent from Cell 2 to the highest priority cell (Cell 1). The muting proposal 143 proposes to Cell 1 that Cell 3 be muted in order to provide proactive inter-cell co-ordination.

Thus, both of the lower priority cells (i.e. the cells with a larger time-left-to-outage) proactively propose an inter-cell interference co-ordination (ICIC) assistance to the highest priority cell (Cell 1) through exchanging muting proposal messages.

Cell 1 sends a first recommended muting message 144 to Cell 3 and a second recommending muting message 145 to Cell 2. The recommended muting messages 144 and 145 provide proposed muting configurations.

The first recommended muting message 144 is accepted by Cell 3 and an accept message 146 sent to Cell 1. Similarly, the second recommended muting message 145 is accepted by Cell 2 and an accept message 147 sent to Cell 1.

At operations 148a and 148b the respective muting proposals are implemented at Cell 2 and Cell 3 respectively such that inter-cell interference free uplink transmission 150 can occur at Cell 1. The operations 148a, 148b and 150 collectively form inter-cell co-ordination (thereby implementing operation 96 of the algorithm 90 described above).

Figure 12:
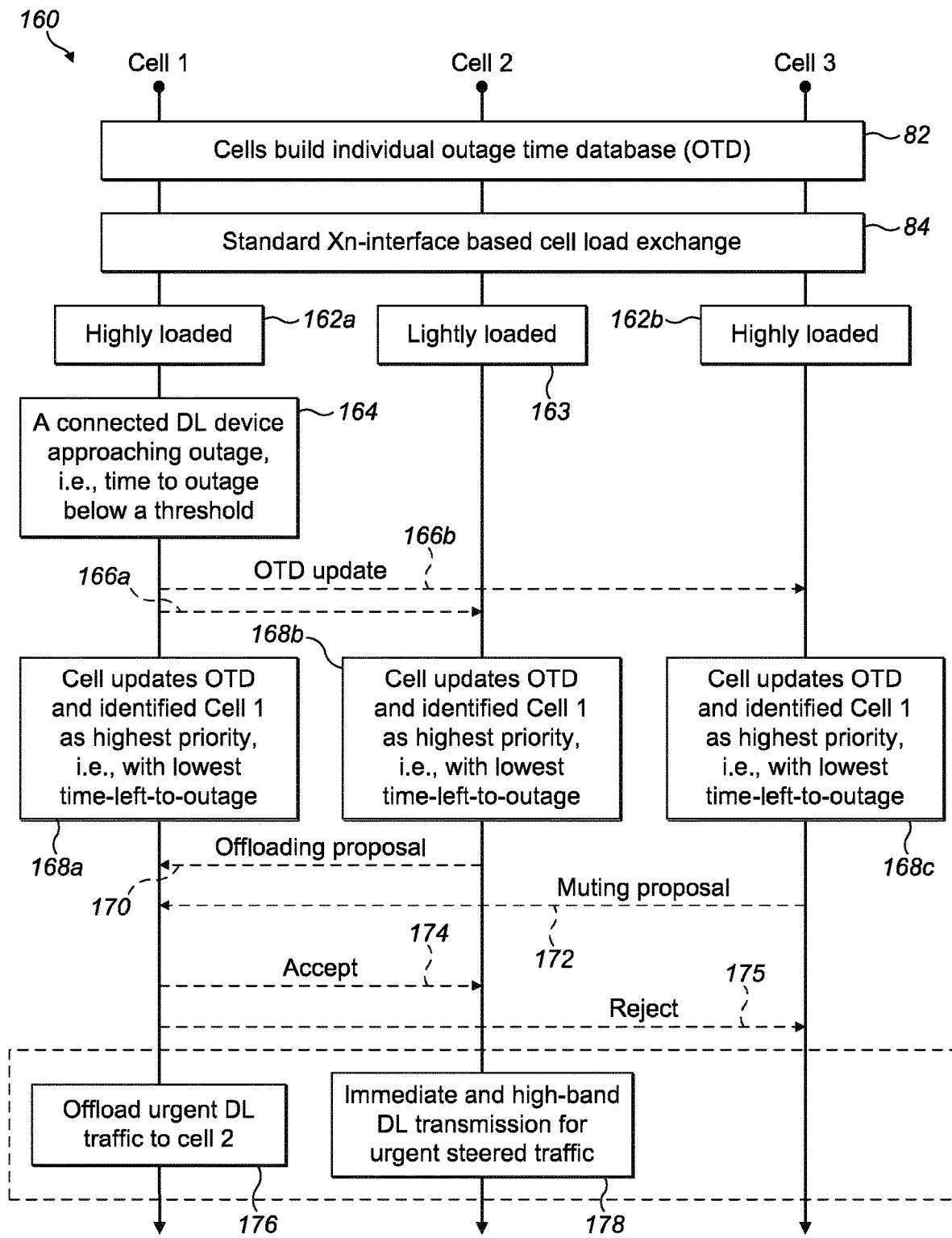

FIG. 12 is a message sequence, indicated generally by the reference numeral 160, in accordance with an example embodiment. The message sequence 160 shows messages transferred between a Cell 1 (such as the first cell 51 described above), Cell 2 (such as the second cell 52 described above) and Cell 3 (such as the third cell 53 described above).

At operation 82, each of the cells builds an individual/local outage time database (OTD). The operation 82 includes a number of steps, as discussed further above.

At operation 84, load information is exchange between the cells as part of Xn-interface specifications. In this way, each cell becomes aware of the load level of its surrounding cells.

At operation 162a, it is determined that Cell 1 is highly loaded. Similarly, at operation 162b it is determined that the Cell 3 is highly loaded. However, at operation 163 it is determined that Cell 2 is lightly loaded.

At operation 164, it is determined that a connected downlink device at Cell 1 is approaching an outage condition (i.e. a time to outage of the downlink device is below a threshold level). In response to the determination at operation 164, an OTD update message 166a is sent from Cell 1 to Cell 2 and an OTD update message 166b is sent from Cell 1 to Cell 3. As discussed above, the OTD update messages 166a and 166b enable multi-cell OTDs to be generated at Cell 2 and Cell 3.

At this stage, multi-cell OTDs are generated at each cell and those multi-cell OTDs may be locally sorted. This enables the relative priorities of the cells to be determined (such that the cell with the lowest time to outage remaining can be identified).

At operation 168a, it is determined (at Cell 1) that Cell 1 has the highest priority. Similar determinations are made in operation 168b (at Cell 2) and operation 168c (at Cell 3).

At Cell 2 a determination is made that Cell 2 is lightly loaded and is not the highest priority cell. As a result, an offloading proposal 170 is sent from Cell 2 to the highest priority cell (Cell 1 in this example). The offloading proposal 170 recommends a downlink offloading assistance to Cell 1.

At Cell 3, a determination is made that Cell 3 is highly loaded, but is not the highest priority cell. As a result, a muting proposal 172 is sent from Cell 3 to the highest priority cell (Cell 1 in this example). The muting proposal 142 proposes to Cell 1 that Cell 3 be muted in order to provide proactive inter-cell co-ordination.

Thus, both of the lower priority cells (i.e. the cells with a larger time-left-to-outage) proactively propose an inter-cell interference co-ordination (ICIC) assistance to the highest priority cell (Cell 1); however, the nature of the co-ordination assistance offered is different.

Cell 1 accepts the proposal to offload the latency-degraded device to Cell 2 (and therefore sends an accept message 174 to Cell 2). Accordingly, Cell 1 rejects the assistance offered by Cell 3 (and therefore sends a reject message 175 to Cell 3).

On receipt of the reject message 175, Cell 3 discards the muting proposal and so the proposed muting is not implemented.

In operations 176 and 178 the offload proposal is implemented by Cell 1 and Cell 2. The operations 176 and 178 collectively form inter-cell co-ordination (thereby implementing operation 96 of the algorithm 90 described above).

The message sequence 130 and 160 therefore describe example protocols of generating offloading and muting proposals and also described example protocols for responding to offloading and muting proposals.

Based on the updated multi-cell OTD at each cell, cells proactively coordinate to seek to ensure fast and interference-controlled conditions for cells with the most critical flows.

A destination cell updates its own OTD with the OTD entries received from neighbouring source cells. Then, a destination cell identifies the most critical source cells with the lowest time to outage entries. Accordingly, a destination cell becomes aware of the actual latency performance of its own connected devices as well as the critical surrounding source cells. Thus, depending on its load and interference conditions, a cell can proactively send either an offloading proposal or a muting proposal to critical, i.e., highest priority, source cells over the Xn-interface.

The offloading proposal indicates the destination cell recommends offloading the critical devices with the urgent DRB flows from source to destination cell. The muting proposal may indicate the destination cell recommends certain UL/DL resource muting in order to facilitate an interference-free transmission of the critical DRB payload in the source cell.

Furthermore, if a destination cell cannot mute certain resources or accept traffic offloading from source cell(s), it does not send either the offloading proposal or the muting proposal and it shall be excluded from coordination.

At the source cell, after receiving the offloading proposal and/or muting proposals from the neighbouring cells, cross-cell conflicts may occur. Thus, in order to resolve potential conflicts, a source cell sends back either "accept", "reject", "recommended offload" or "recommended muting" messages, as follows:

ACCEPT: a source cell accepts the corresponding proposal from a destination cell (without any changes to that proposal).

REJECT: a source cell rejects the corresponding proposal from a destination cell without further action, i.e., no further coordination is needed between source cell and this destination cell.

RECOMMENDED OFFLOAD: a source cell sends back the respective destination cell with a recommended offloading configuration in response to the offloading proposal. This may be useful in cases when the state of the latency-degraded device has quickly changed (payload transmitted/further retransmitted) before sending a new OTD update from source to destination cell.

RECOMMENDED MUTING: a source cell sends back the respective destination cell with a recommended muting configuration in response to the muting proposal. This may be used to resolve potential conflicts. For example, two destination cells may offer muting proposals for a neighbouring critical source cell, with various proposed timing and frequency resources to be muted. Thus, a source cell may recommend a common muting configuration for all destination cells and accordingly schedule the latency-degraded device(s) with interference-free conditions over the agreed resources.

It should be noted that in the message sequences 130 and 160, the various muting and offloading proposals are triggered from the cell that are offering muting or offloading support to another cell (e.g. from a destination cell to a source cell), thereby offering proactive inter-cell assistance. This is different to a mechanism in which a cell that needs support requests that support from other cells in the vicinity (e.g. by sending requests from a source cell to a destination cell). In system in which a source cell (needing support) sends requests to one or more destination cells, each destination cell may accept or reject a request and hence, another round of coordination/signalling may be needed to agree on specific inter-cell coordination. In embodiments having critically tight latency budgets, it may be an advantage to implement a system without such additional rounds of inter-cell signalling.

Figure 13:
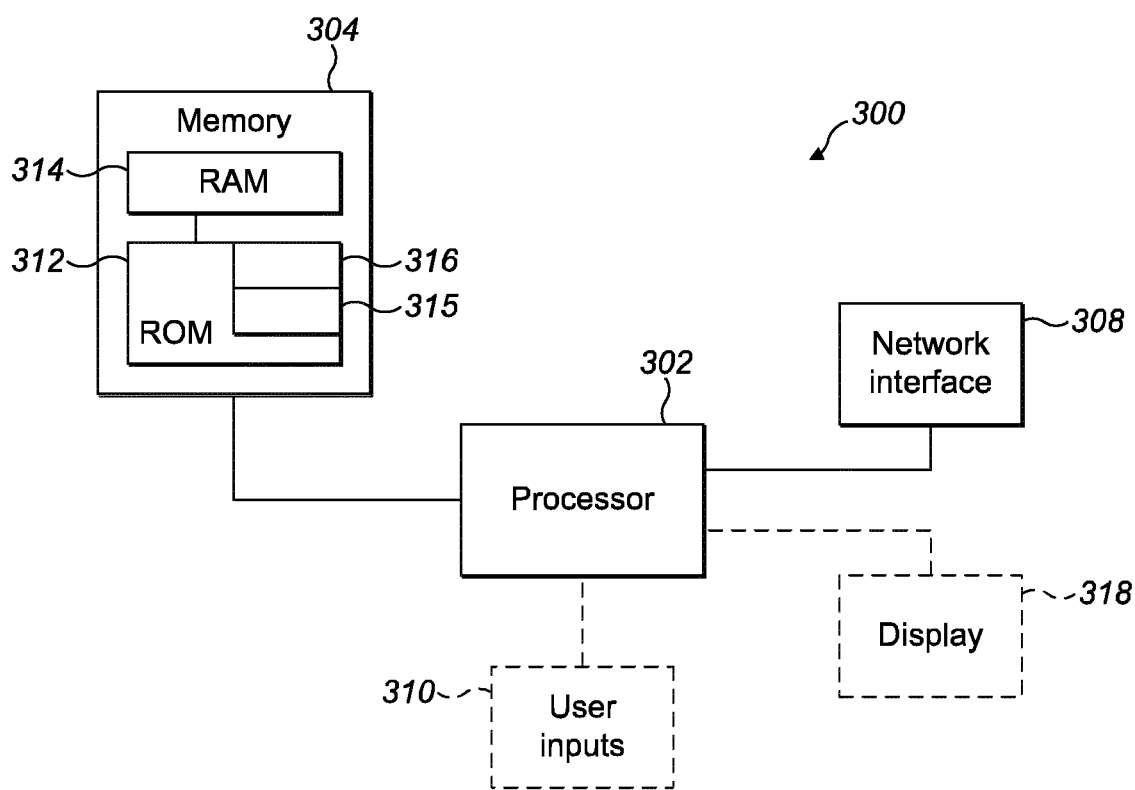
FIG. 13 is a block diagram of components of a system in accordance with an example embodiment.

For completeness, FIG. 13 is a schematic diagram of components of one or more of the example embodiments described previously, which hereafter are referred to generically as a processing system 300. The processing system 300 may, for example, be the apparatus referred to in the claims below.

The processing system 300 may comprise one or more of: a processor 302, a memory 304 closely coupled to the processor and comprised of a RAM 314 and a ROM 312, a user input 310 (such as a touch screen input, hardware keys and/or a voice input mechanism) and a display 318 (at least some of those components may be omitted in some example embodiments). The processing system 300 may comprise one or more network/apparatus interfaces 308 for connection to a network/apparatus, e.g. a modem which may be wired or wireless. The interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 60, 90 and 110 or the message sequences 80, 100, 130 and 160 described above. Note that in the case of small device/apparatus the memory can be most suitable for small size usage i.e. not always a hard disk drive (HDD) or a solid state drive (SSD) is used. The memory 304 may include computer program code, such that the at least one memory 304 and the computer program may be configured, with the at least one processor 302, may cause the performance of the apparatus.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 14A:
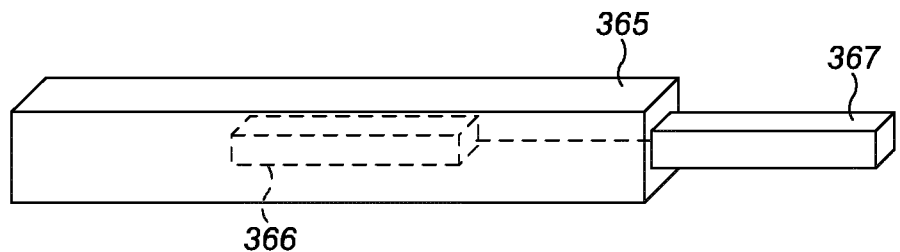
FIGS. 14A and 14B show tangible media, respectively a removable non-volatile memory unit and a Compact Disc (CD) storing computer-readable code which when run by a computer perform operations according to example embodiments.
Figure 14B:
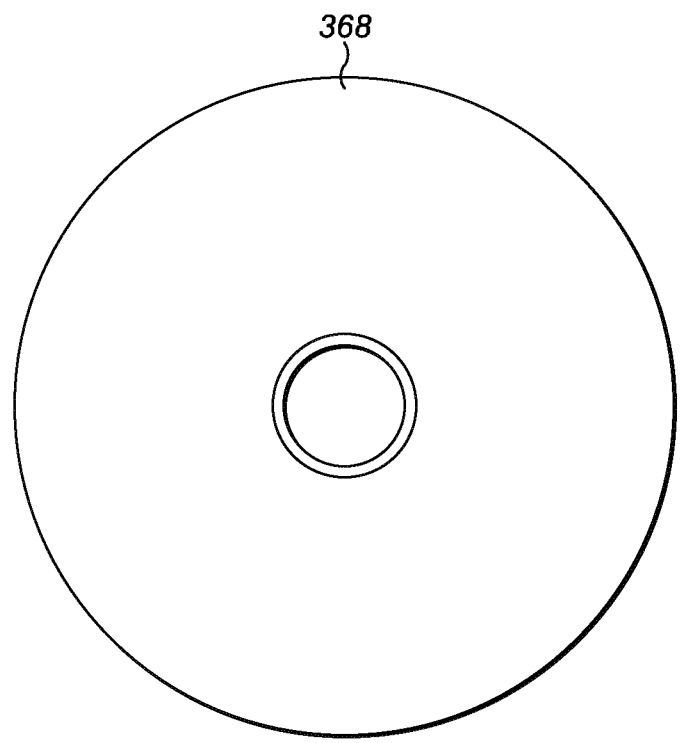

FIGS. 14A and 14B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams and message sequences of FIGS. 5 and 7 to 12 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus, comprising:
   at least one processor; and
   at least one memory storing instructions that, when executed by the at least one processor, cause the apparatus at least to perform:
   generating a local outage time database for a first cell of a mobile communication system, wherein the local outage time database stores first latency data for each of a plurality of devices served by the first cell, wherein each first latency data comprises time left to outage data for the respective device;
   sending selected parts of the local outage time database to one or more other cells of the mobile communication network;
   receiving second latency data from at least one of the one or more other cells of the mobile communication system, wherein said second latency data includes time left to outage data for one or more devices served by said other cells; and
   generating a multi-cell outage time database including some or all of the shared selected parts of the local outage time database and some or all of the received second latency data.

2. The apparatus as claimed in claim 1, wherein the instructions, when executed by the at least one processor, cause the apparatus to further perform:
sorting the multi-cell outage time database in order of time left to outage data.

3. The apparatus as claimed in claim 1, wherein the instructions, when executed by the at least one processor, cause the apparatus to further perform:
identifying the cell serving the device having the shortest time left to outage as a highest priority cell amongst the first cell and the other cell(s).

4. The apparatus as claimed in claim 3, wherein the instructions, when executed by the at least one processor, cause the apparatus to further perform:
providing inter-cell co-ordination based on the identified highest priority cell.

5. The apparatus as claimed in claim 4, wherein providing inter-cell co-ordination comprises:
determining whether the first cell is lightly loaded; and
in the event that the first cell is not the highest priority cell and is lighted loaded, sending an offloading proposal to the identified highest priority cell proposing offloading of one or more latency-critical devices from the highest priority cell to the first cell.

6. The apparatus as claimed in claim 5, wherein the instructions, when executed by the at least one processor, cause the apparatus to further perform:
initiating the offload of said one or more latency-critical device on receipt of an acceptance of said offloading proposal from the identified highest priority cell.

7. The apparatus as claimed in claim 4, wherein providing inter-cell co-ordination comprises:
determining whether the first cell is highly loaded; and
in the event that the first cell is not the highest priority cell and is highly loaded, sending muting proposal to the identified highest priority cell.

8. The apparatus as claimed in claim 7, wherein the instructions, when executed by the at least one processor, cause the apparatus to further perform:
initiating muting of said first cell on receipt of an acceptance of said muting proposal from the highest priority cell.

9. The apparatus as claimed in claim 4, wherein providing inter-cell co-ordination comprises:
receiving, at the first cell, an offload proposal or a muting proposal from one or more of said one or more other cells of the mobile communication system; and
responding to said request in accordance with a protocol.

10. The apparatus as claimed in claim 1, wherein the instructions, when executed by the at least one processor, cause the apparatus to further perform:
determining the selected parts of the local outage time database to send to the one or more other cells of the mobile communication network.

11. The apparatus as claimed in claim 1, wherein the local outage time database for the first cell stores one or more of:
a cell identifier for the first cell;
an identifier for each of the plurality of devices served by the first cell;
time left to outage data for each of said devices;
a link direction for each of the devices; and
cell identifier for any identified aggressor cells.

12. The apparatus as claimed in claim 1, wherein each entry of the multi-cell outage time database comprises:
a cell identifier;
a device identifier;
a time left to outage for the respective device; and
a link direction for each of the devices.

13. A method, comprising:
generating a local outage time database for a first cell of a mobile communication system, wherein the local outage time database stores first latency data for each of a plurality of devices served by the first cell, wherein each first latency data comprises time left to outage data for the respective device;
sending selected parts of the local outage time database to one or more other cells of the mobile communication network;
receiving second latency data from at least one of the one or more other cells of the mobile communication system, wherein said second latency data includes time left to outage data for one or more devices served by said other cells; and
generating a multi-cell outage time database including some or all of the shared selected parts of the local outage time database and some or all of the received second latency data.

14. The method as claimed in claim 13, further comprising:
sorting the multi-cell outage time database in order of time left to outage data;
identifying the cell serving the device having the shortest time left to outage as a highest priority cell amongst the first cell and the other cell(s); and
providing inter-cell co-ordination based on the identified highest priority cell.

15. The method as claimed in claim 13, wherein providing inter-cell co-ordination comprises:
determining whether the first cell is lightly loaded; and
in the event that the first cell is not the highest priority cell and is lighted loaded, sending an offloading proposal to the identified highest priority cell proposing offloading of one or more latency-critical devices from the highest priority cell to the first cell.

16. The method as claimed in claim 13, wherein providing inter-cell co-ordination comprises:
determining whether the first cell is highly loaded; and
in the event that the first cell is not the highest priority cell and is highly loaded, sending muting proposal to the identified highest priority cell.

17. The method as claimed in claim 13, wherein providing inter-cell co-ordination comprises:
receiving, at the first cell, an offload proposal or a muting proposal from one or more of said one or more other cells of the mobile communication system; and
responding to said request in accordance with a protocol.

18. The method as claimed in claim 13, further comprising:
determining the selected parts of the local outage time database to send to the one or more other cells of the mobile communication network.

19. The method as claimed in claim 13, further comprising:
identifying cells of the one or more other cells of the mobile communication system as aggressor cells in the event that signal power at the first cell from said other cell compared with signal power received at the first cell from a server node is above a threshold.

20. A computer program embodied on a non-transitory computer-readable medium, said computer program comprising instructions that, when executed on an apparatus, cause the apparatus to perform at least the following:
generating a local outage time database for a first cell of a mobile communication system, wherein the local outage time database stores first latency data for each of a plurality of devices served by the first cell, wherein each first latency data comprises time left to outage data for the respective device;

sending selected parts of the local outage time database to one or more other cells of the mobile communication network;

receiving second latency data from at least one of the one or more other cells of the mobile communication system, wherein said second latency data includes time left to outage data for one or more devices served by said other cells; and generating a multi-cell outage time database including some or all of the shared selected parts of the local outage time database and some or all of the received second latency data.

\* \* \* \* \*